(12) United States Patent
McFarland

(10) Patent No.: US 9,125,082 B2
(45) Date of Patent: *Sep. 1, 2015

(54) MULTI-CARRIER COMMUNICATION SYSTEMS EMPLOYING VARIABLE SYMBOL RATES AND NUMBER OF CARRIERS

(71) Applicant: The Connectivity Patent Trust, Rancho Santa Fe, CA (US)

(72) Inventor: William J. McFarland, Portola Valley, CA (US)

(73) Assignee: The Connectivity Patent Trust, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/550,939

(22) Filed: Nov. 22, 2014

(65) Prior Publication Data

US 2015/0078467 A1 Mar. 19, 2015

Related U.S. Application Data

(60) Continuation of application No. 12/409,404, filed on Mar. 23, 2009, now Pat. No. 8,923,431, which is a division of application No. 09/839,565, filed on Apr. 20, 2001, now Pat. No. 7,397,859.

(60) Provisional application No. 60/199,049, filed on Apr. 22, 2000.

(51) Int. Cl.
*H04W 28/02* (2009.01)
*H04L 27/26* (2006.01)
(Continued)

(52) U.S. Cl.
CPC ......... *H04W 28/0231* (2013.01); *H04L 1/0002* (2013.01); *H04L 1/0017* (2013.01);
(Continued)

(58) Field of Classification Search
CPC .............. H04L 27/2626; H04L 5/0046; H04L 25/0224; H04L 1/0002; H04B 2201/70703
See application file for complete search history.

(56) References Cited

U.S. PATENT DOCUMENTS 5,261,118 A 11/1993 Vanderspool, II et al.
5,268,933 A 12/1993 Averbuch
(Continued)

FOREIGN PATENT DOCUMENTS

EP 0 869 647 10/1998
EP 0 905 948 3/1999
(Continued)

OTHER PUBLICATIONS

Meyr, et al., Digital Communication Receivers, Chapter 5: "Synthesis of Synchronization Algorithms" (John Wiley and Sons, 1998, New York).
(Continued)

*Primary Examiner* — Curtis Odom
(74) *Attorney, Agent, or Firm* — Thibault Patent Group

(57) ABSTRACT

A multi-carrier communication system such as an OFDM or DMT system has nodes which are allowed to dynamically change their receive and transmit symbol rates, and the number of carriers within their signals. Changing of the symbol rate is done by changing the clocking frequency of the nodes' iFFT and FFT processors, as well as their serializers and deserializers. The nodes have several ways of dynamically changing the number of earners used. The selection of symbol rate and number of earners can be optimized for a given channel based on explicit channel measurements, a priori knowledge of the channel, or past experience. Provision is made for accommodating legacy nodes that may have constraints in symbol rate or the number of carriers they can support. The receiver can determine the correct symbol rate and number of earners through a priori knowledge, a first exchange of packets in a base mode that all nodes can understand, or an indication in the header of the data packet which is transmitted in a base mode of operation that all nodes can understand.

12 Claims, 5 Drawing Sheets

(51) Int. Cl.
- *H04L 1/00* (2006.01)
- *H04L 1/20* (2006.01)
- *H04L 25/08* (2006.01)
- *H04L 5/00* (2006.01)
- *H04L 25/02* (2006.01)

(52) U.S. Cl.
CPC ............ *H04L1/0025* (2013.01); *H04L 1/0026* (2013.01); *H04L 1/0034* (2013.01); *H04L 1/20* (2013.01); *H04L 5/003* (2013.01); *H04L 5/006* (2013.01); *H04L 5/0046* (2013.01); *H04L 5/0064* (2013.01); *H04L 25/08* (2013.01); *H04L 27/2602* (2013.01); *H04L 27/2613* (2013.01); *H04L 27/2626* (2013.01); *H04L 27/2628* (2013.01); *H04L 5/0007* (2013.01); *H04L 25/0224* (2013.01); *H04L 27/2608* (2013.01)

(56) References Cited

U.S. PATENT DOCUMENTS

| | | | |
|---|---|---|---|
| 5,291,289 | A | 3/1994 | Hulyalkar et al. |
| 5,499,236 | A | 3/1996 | Giallorenzi et al. |
| 5,506,867 | A | 4/1996 | Kotzin et al. |
| 5,561,701 | A | 10/1996 | Ichikawa |
| 5,680,388 | A | 10/1997 | Kahre |
| 5,802,044 | A | 9/1998 | Baum et al. |
| 5,870,427 | A | 2/1999 | Tiedemann, Jr. et al. |
| 5,920,557 | A | 7/1999 | Hirata |
| 6,044,067 | A | 3/2000 | Suzuki |
| 6,084,917 | A | 7/2000 | Kao et al. |
| 6,141,353 | A | 10/2000 | Li |
| 6,175,550 | B1 | 1/2001 | van Nee |
| 6,275,518 | B1 | 8/2001 | Takahashi et al. |
| 6,442,129 | B1 | 8/2002 | Yonge et al. |
| 6,452,907 | B1 | 9/2002 | Levin |
| 6,553,062 | B1 | 4/2003 | Marum |
| 6,726,297 | B1 | 4/2004 | Uesugi |
| 6,879,638 | B1 | 4/2005 | Bertin et al. |
| 7,039,120 | B1 | 5/2006 | Thoumy et al. |
| 7,397,859 | B2 * | 7/2008 | McFarland .................... 375/260 |
| 2001/0033560 | A1 | 10/2001 | Tong et al. |

FOREIGN PATENT DOCUMENTS

| | | |
|---|---|---|
| GB | 2 277 232 | 10/1994 |
| WO | 98/57472 | 12/1998 |
| WO | 99/49587 | 9/1999 |
| WO | 00/39977 | 7/2000 |

OTHER PUBLICATIONS

Meyr et al., Digital Communication Receivers, Chapter 10: "DSP System Implementation" (John Wiley and Sons, 1998, New York).

Mueller et al., "Timing recovery in digital synchronous data receivers" (IEEE Trans. Communications, vol. COM-24, pp. 516-531, May 1976).

Sklar, Digital Communications: Fundamentals and Applications, Chapter 8: "Synchronization in the Context of Digital Communications" (Prentice Hall, 1988, New Jersey).

Verdu, Multiuser Detection, Chapter 6: "Nondecorrelating Linear Multiuser Detection" (Cambridge University Press, 1998).

Verdu, Multiuser Detection, Chapter 7 "Decision-Driven Dectors" (Cambridge University Press, 1998).

Honig et al., "Blind Adaptive Multiuser Detection" (IEEE Trans. on Information Theory, pp. 944-961, vol. 41, No. 4, Jul. 1995).

Le Floch et al., "Coded Orthogonal Frequency Division Multiplex" (IEEE Proceedings, pp. 982-996, vol. 83, No. 6, Jun. 1995).

* cited by examiner

MULTI-CARRIER COMMUNICATION SYSTEMS EMPLOYING VARIABLE SYMBOL RATES AND NUMBER OF CARRIERS

CLAIM OF PRIORITY

This application claims the benefit of priority from and is a continuation application of U.S. patent application Ser. No. 12/409,404, entitled "Multi-Carrier Communication Systems Employing Variable Symbol Rates and Number of Carriers" and filed Mar. 23, 2009 (now allowed), which claims the benefit of priority from and is a divisional application of U.S. patent application Ser. No. 09/839,565, entitled "Multi-Carrier Communication Systems Employing Variable Symbol Rates and Number of Carriers" and filed Apr. 20, 2001 (now U.S. Pat. No. 7,397,859 issued on Jul. 8, 2008), which claims the benefit of priority from U.S. Provisional Patent Application Ser. No. 60/199,049, entitled "Multi-Carrier Communication Systems Employing Variable Symbol Rates and Number of Carriers" and filed Apr. 22, 2000, all of which are fully incorporated herein by reference for all purposes and to the extent not inconsistent with this application.

BACKGROUND

1. Field of the Invention

The present invention is generally directed to communication systems and networks and is particularly directed to such systems and networks which use multi-carrier protocols such as orthogonal frequency division multiplexing and discrete multi-tone protocols, and to techniques for communicating there over.

2. Background of Related Art

Orthogonal frequency division multiplexing (OFDM) and discrete multi-tone (DMT) are two closely related formats which have become popular as communication protocols. Systems of this type take a relatively wide bandwidth communication channel and break it into many smaller frequency sub-channels. The narrower sub-channels are then used simultaneously to transmit data at a high rate. These techniques have advantages when the communication channel has multi-path or narrow band interference.

The following discussion of the prior art and the invention will address OFDM systems; however, it will be understood that the invention is equally applicable to DMT systems (as well as other types of communication systems) with only minor modifications that will be readily apparent to those skilled in the art.

A functional block diagram of a typical OFDM transmitter is shown in FIG. 1. Here, an incoming stream 10 of N symbols $d_0, d_1 \ldots d_{N-1}$ is mapped by a serial-to-parallel converter 20 over N parallel lines 30, each line corresponding to a particular subcarrier within the overall OFDM channel. An Inverse Fast Fourier Transform (iFFT) processor 40 accepts these as frequency domain components and generates a set 50 of time domain subcarriers corresponding thereto. Each set of time domain subcarriers is considered a symbol. The rate at which these symbols are created determines the rate at which transitions are made on each of the individual carriers (one transmission per symbol time). The time domain subcarriers are converted by a parallel-to-serial converter 60. Due to the characteristics of the inverse Fourier transform, although the frequency spectra of the subcarrier channels overlap, each subcarrier is orthogonal to the others. Thus, the frequency at which each subcarrier in the received signal is evaluated is one at which the contribution from all other signals is zero.

A functional block diagram of the corresponding OFDM receiver is shown in FIG. 2. Here, an OFDM signal is received and converted into multiple time domain signals 210 by a serial-to-parallel converter 220. These signals are processed by a Fast Fourier Transform (FFT) processor 230 before being multiplexed by parallel-to-serial converter 240 to recover the original data stream 250.

FIG. 3 shows a plot of the transmitted frequency spectrum from an OFDM system. The number of carriers within the signal is determined by the size of the iFFT processor in the transmitter and corresponding size of the FFT processor in the receiver. The spacing of the individual carriers within the signal is dependent on the rate at which the iFFT symbols are generated (the symbol rate). This is generally proportional to the rate at which the iFFT and FFT processors are being clocked. Finally, the overall bandwidth occupied by the signal is roughly equivalent to the number of carriers multiplied by the carrier spacing.

The symbol rate is generally chosen to limit the effect of multi-path interference in the channel. When the rate of iFFT/FFT symbol generation is low, the rate of the symbols going over the channel is slow, and the carrier spacing is close. These slow symbols are long in time, much longer than the longest echoes within the multi-path delays of the channel. Therefore, it is possible to avoid or minimize the multi-path echoes, since they are much shorter than the data symbols themselves.

In some multi-carrier systems, the amount of power allocated to each carrier is varied according to the quality of the channel over which the signal will be sent. In addition, the complexity of the modulation constellation is also varied according to the channel on a per carrier basis. For example, some carriers may use 4-QAM modulation, while others use 16-QAM, 64-QAM or even more complex modulation. The more complex modulations allow more data to be transmitted in a single symbol or period of time. However, they require a much better signal to noise ratio in order to operate correctly. In other systems, it may be difficult to determine details about the channel, or the channel may change rapidly in time, such that this adaptation of the multi-carrier transmission is not practical. Rapidly changing channel conditions are common in radio communications.

Although some existing multi-carrier systems adapt the power allocation and modulation complexity as described above, existing multi-carrier systems maintain a constant number of carriers (constant size of the iFFT and FFT processors) and a constant carrier spacing (constant rate of iFFT/FFT symbol generation), and therefore a constant overall occupied bandwidth. The constant carrier spacing is chosen to insure that multi-path echoes are a small portion of the data symbol time in all possible channels that the communication system might encounter.

It is advantageous to minimize the number of carriers in use. The number of carriers is directly related to the size of the iFFT processor in the transmitter and corresponding FFT processor in the receiver. The complexity and power consumption of an iFFT or FFT processor increases as N*log(N), where N is the size of the processor, and therefore the number of carriers present in the signal. To limit complexity and particularly power consumption, it is therefore desirable to minimize the number of carriers in use. Additionally, it is desirable to generate the iFFT/FFT symbols at the highest rate possible. This increases the symbol rate, and thereby increases the data rate within the channel. Taken together, the goal of low complexity, low power, and high data rate pushes toward a system with few carriers and a high iFFT/FFT symbol generation rate. However, there is a limitation. As the symbol rate becomes higher, the symbols become shorter in time. For a given channel, the multi-path echoes will become a larger fraction of the symbol time, and will increasingly corrupt the communication. In addition, since the total bandwidth occupied is roughly equal to the number of carriers times the carrier spacing (proportional to the symbol rate), the overall occupied bandwidth may also increase as the symbol rate is increased.

Existing multi-carrier systems, which maintain a fixed number of carriers, a fixed symbol rate, and a fixed overall bandwidth, do not operate under optimal conditions. Because these fixed parameters must be chosen to accommodate the worst possible channel conditions, they are often far too conservative and not optimal for the channel currently available.

SUMMARY OF THE INVENTION

In view of the above problems of the prior art, an object of the present invention is to provide a multi-carrier system in which the number of carriers, the symbol rate, and thereby the overall occupied bandwidth can be varied. This can provide a more optimal combination of data rate, power consumption, and circuit complexity for a given channel.

It is another object of the present invention to provide a control system that regulates the operational mode of a multi-carrier system with regard to the number of carriers, symbol rate, and occupied bandwidth. This control system may operate based on a priori knowledge of the channel conditions (in response to a sounding of the channel), or in a trial and error fashion.

It is a further object of the present invention to provide a method for dynamically changing the number of carriers, symbol rate, and occupied bandwidth in a multi-carrier communication system on a packet-to-packet basis.

The above objects are achieved according to one aspect of the present invention by changing the size and clocking rate of iFFT and FFT processors used in a multi-carrier communication system as well as their surrounding circuits. Control signals for these changes in operation can be derived from a controlling circuit that has user inputs; results from channel sounding, a history of trial and error results, or information in the beginning of a received data packet.

BRIEF DESCRIPTION OF THE DRAWINGS

These and other objects, features, and advantages of the present invention are better understood by reading the following detailed description of the preferred embodiments, taken in conjunction with the accompanying drawings, in which.

DETAILED DESCRIPTION

Figure 3:
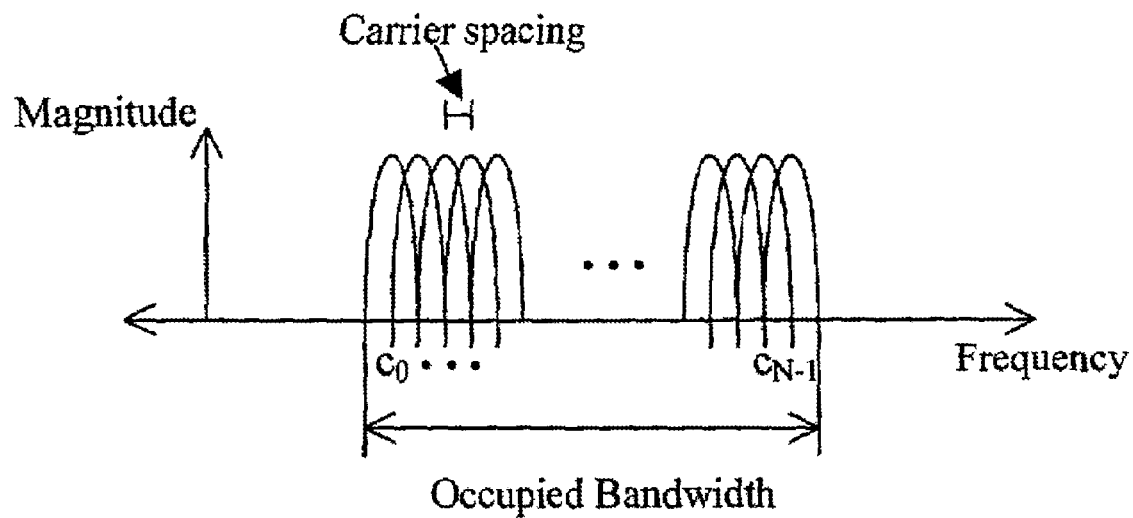
FIG. 3 is a diagram of the spectrum of a transmitted OFDM waveform.
Figure 4:
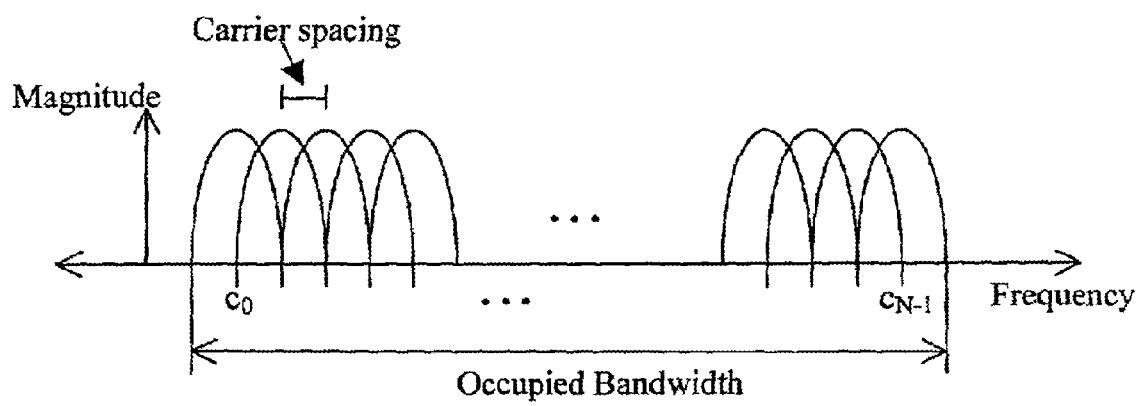
FIG. 4 is a diagram of the spectrum of the transmitted waveform when the symbol rate is doubled.

FIG. 4 shows the transmitted spectrum of an OFDM signal in which the symbol rate has been doubled in comparison to the one shown in FIG. 3. The carrier spacing has doubled, as has the overall occupied bandwidth. Such a signal would be able to transmit at twice the data rate compared to the system in FIG. 3. However, since the symbol rate has doubled and therefore the symbol duration halved, it would be more susceptible to multi-path echoes.

Figure 5:
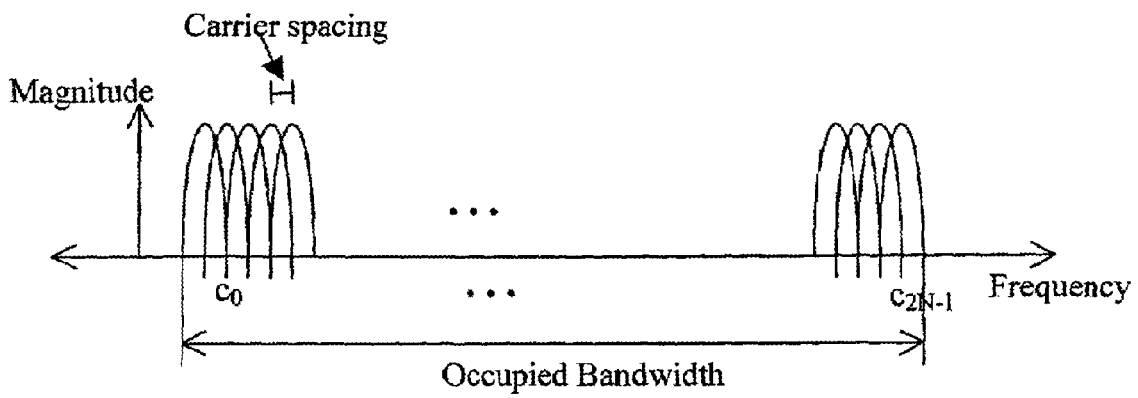
FIG. 5 is a diagram of the spectrum of the transmitted waveform when the size of the iFFT processor is doubled.

FIG. 5 shows the transmitted spectrum of an OFDM signal in which the number of carriers is doubled, but the symbol time remains constant. This approach also doubles the occupied bandwidth and the data rate relative to FIG. 3. However, since the symbol rate is unchanged, it remains resistant to long multi-path echoes. Unfortunately, this approach requires more complex IFFT and FFT processors which consume more power and are more expensive to build.

For a given channel, there is an optimal occupied bandwidth, symbol rate, and thereby number of separate carriers. It is therefore beneficial to be able to vary both the symbol rate and the size of the iFFT processor according to the quality of the current channel.

Variable Symbol Rate

Figure 1:
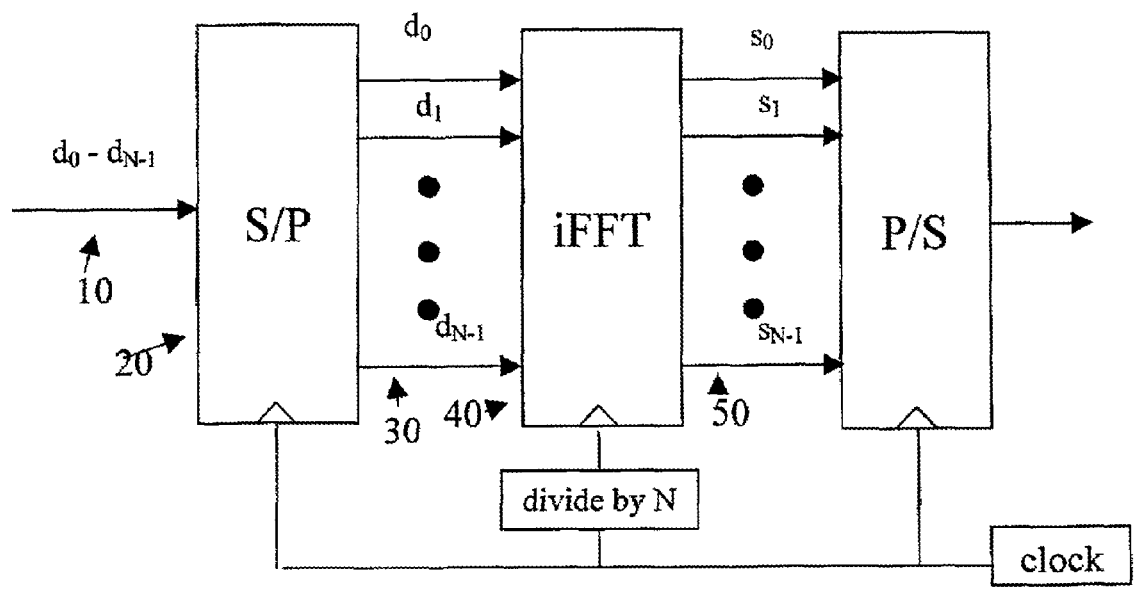
FIG. 1 is a block diagram of an OFDM transmitter according to the prior art.
Figure 2:
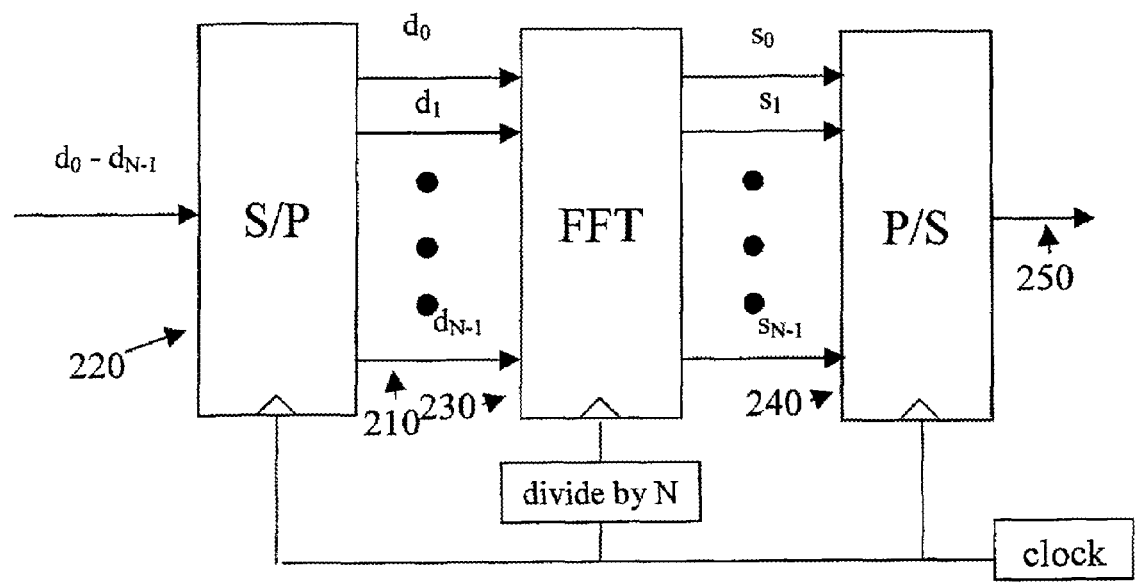
FIG. 2 is a functional block diagram of an OFDM receiver according to the prior art.

Many methods known in the art for changing a clock frequency can be used to change the symbol rate of the multi-carrier system. The following discussion describes several preferred embodiments for varying the symbol rate. As can be seen from the similarity of the transmitting circuit and receiving circuits in FIGS. 1 and 2, almost any approach for changing the symbol rate at the transmitter can be used in a similar fashion at the receiver.

Figure 6:
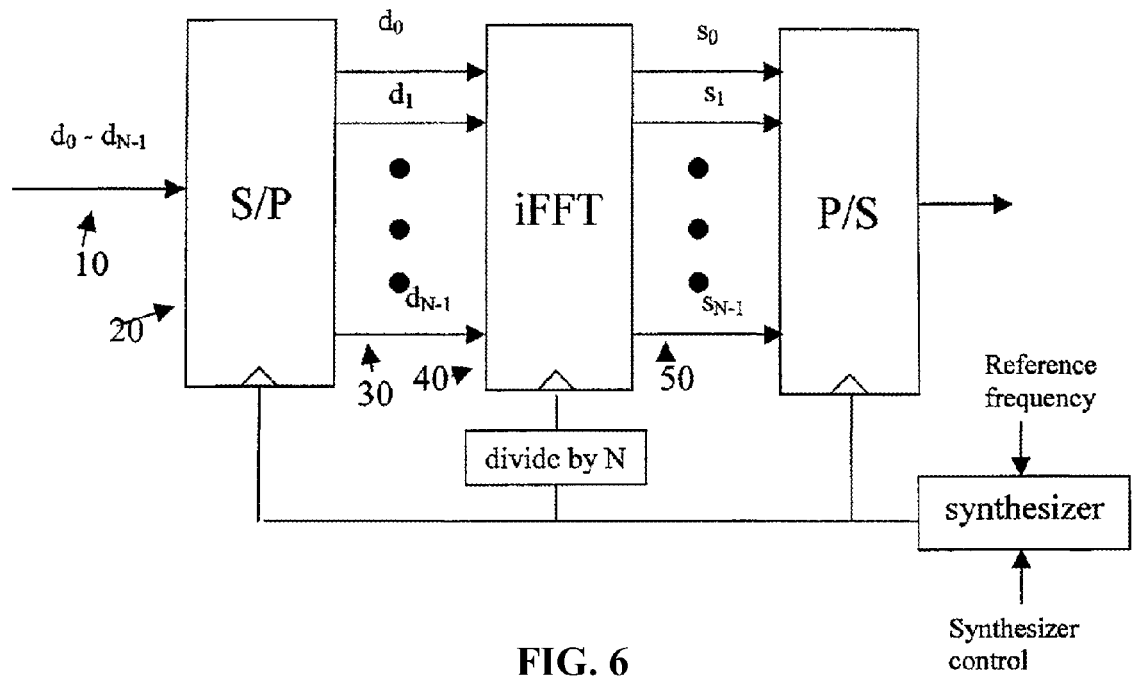
FIG. 6 shows a preferred embodiment of the present invention which changes the symbol rate with a frequency synthesizer.

FIG. 6 shows a circuit for changing the OFDM symbol rate. In this circuit, a frequency synthesizer (or variable phase locked loop) is able to generate nearly any arbitrary frequency with which to clock the IFFT processor and its surrounding serial-to-parallel and parallel-to-serial converters. The advantage to this approach is the symbol rate can be finely adjusted to ideally optimize for a given channel. A disadvantage to this approach is that it takes a significant time for the synthesizer to change its frequency. Therefore, it would not be practical to have the synthesizer change frequency on a packet-by-packet basis in a fast communication system (situations in which changing the symbol rate on a packet-by-packet basis would be desired are presented later).

Figure 7:
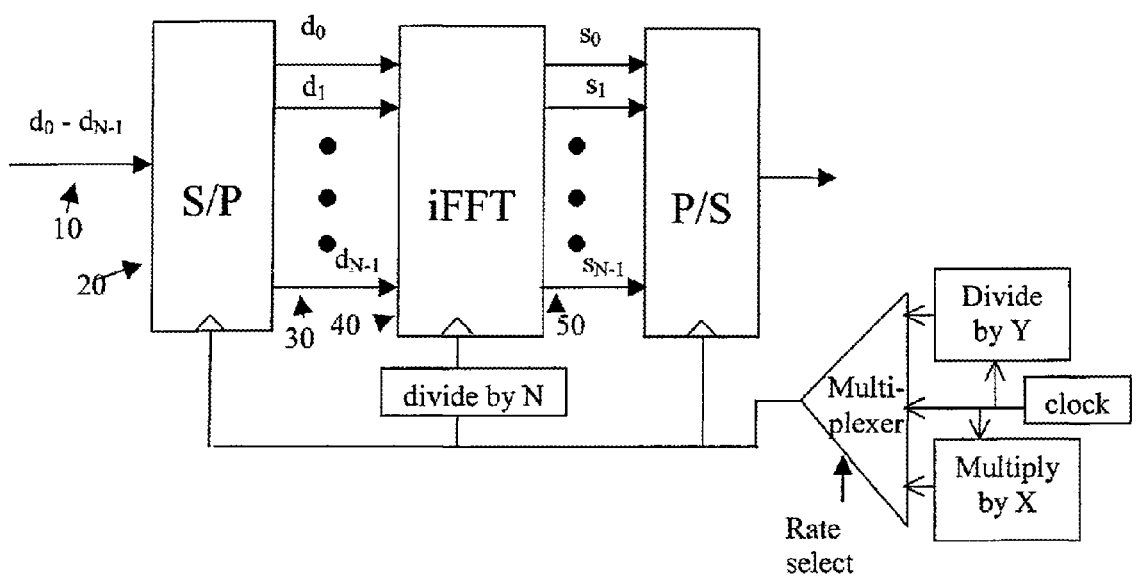
FIG. 7 shows an embodiment which changes the symbol rate with a divider.

FIG. 7 shows a circuit for changing the symbol rate using dividers and multipliers. A multiplexer can be used in order to choose which of the circuits is used at a given time. In the drawing, the dividers have variable divide and multiplication amounts. In practice it might be desirable to use circuits that can only divide by fixed amounts, and select among several of them using a multiplexer as shown. The advantage to this approach is that the changing of clocking frequencies can be done very quickly and in a very well controlled way. This would allow the dynamic changing of symbol rate between packets, or even within packets in a communication system. The disadvantage to this approach is that the symbol rate cannot be as finely adjusted as in the case of a frequency synthesizer.

Variable Number of Carriers

There are a number of ways to change the number of carriers in active use. The following discussion illustrates several preferred embodiments for changing the number of carriers in active use. As before, almost any approach for changing the number of carriers at the transmitter can be used in a similar fashion at the receiver.

Figure 8:
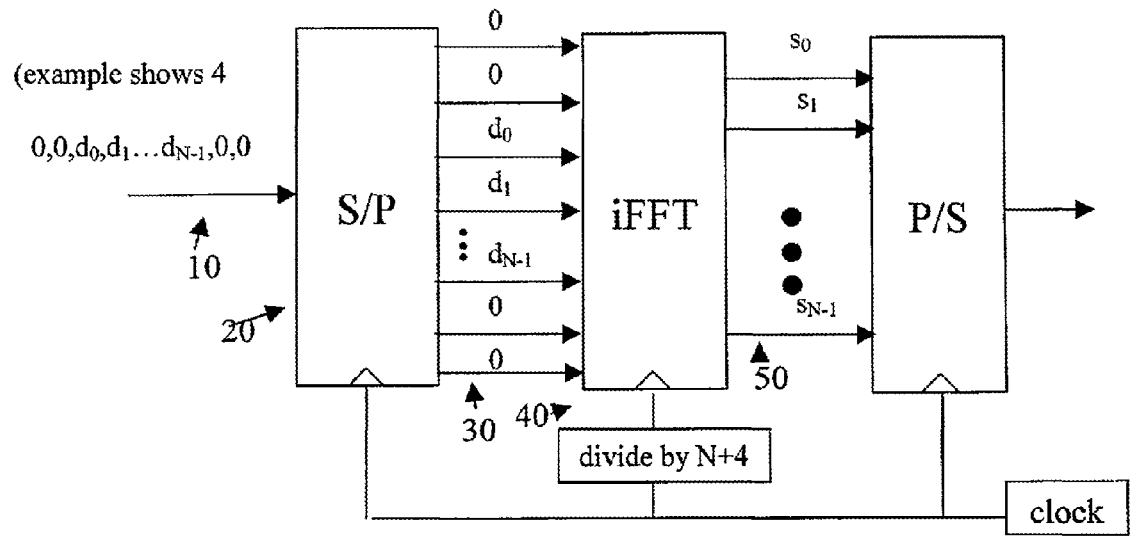
FIG. 8 shows an embodiment which changes the number of carriers with a single fixed iFFT processor.

FIG. 8 shows an approach in which a single iFFT processor can be used without modification to generate a different number of carriers. The iFFT is designed to be sufficiently large enough to handle the maximum number of carriers that might ever be required. In any given situation, a subset of the carriers can be used by simply inputting zero magnitude signals on the carriers that are not to be used. This has the advantage of requiring little change to the overall circuitry and no change at all to the iFFT processor. The disadvantage is that the power savings from using a smaller number of carriers will be minimal.

Another approach is to implement a block of multiple complete iFFT processors of various sizes. For a given transmission, only one of these would be operated. This has the advantage that since only the appropriately-sized processor is in use, the power consumption will be minimized. Unfortunately, fabricating several different sizes of iFFT and FFT processors increases the complexity and thus the cost of the circuit.

Figure 9:
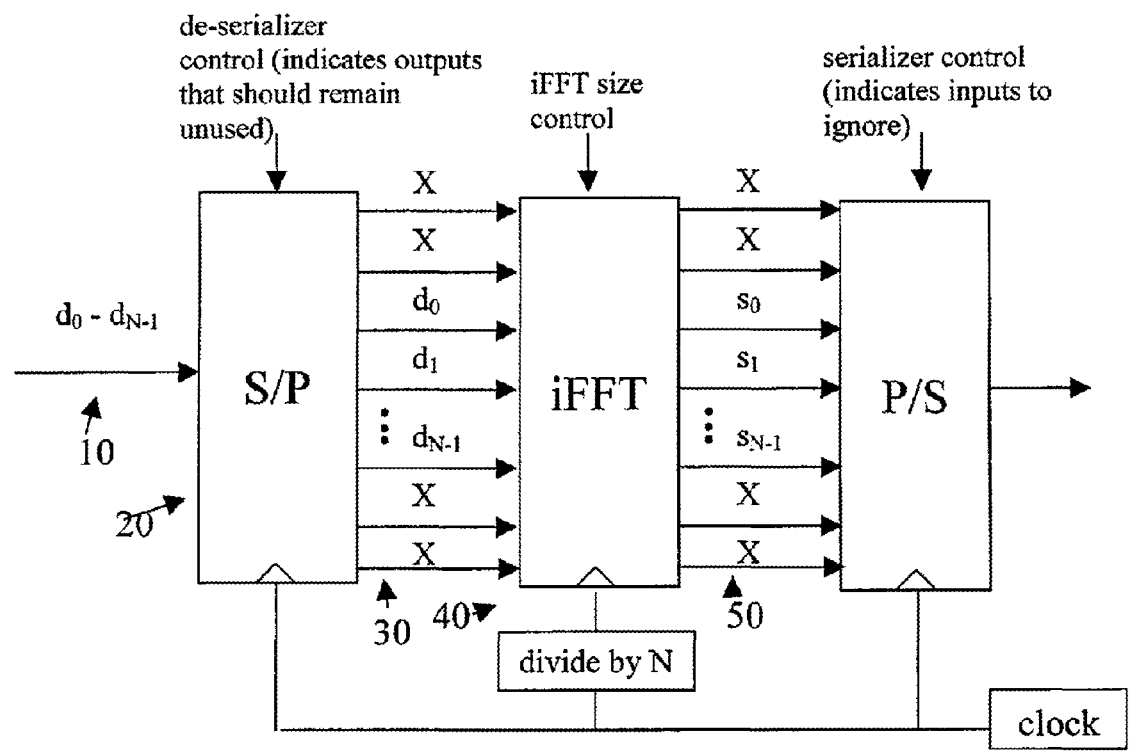
FIG. 9 shows an embodiment which changes the number of carriers with a variable size iFFT processor block.

FIG. 9 shows a circuit in which the iFFT processor itself has been designed to disable portions of its internal circuitry depending on how many carriers are active. Similarly, the serial-to-parallel and parallel-to-serial converters also alter their operation, so they act only on carriers that will actually be used at a given time. This allows the construction of one block of circuitry which operates in a power-efficient manner in all modes of operation.

In general, iFFT and FFT processor sizes come in powers of two. There are structures that can produce an arbitrary number of carriers, but these are less efficient. The number of carriers used can therefore be restricted to be a power of two, or the iFFT and FFT processors can be operated at the power of two size equal to or just larger than the number of carriers desired. The technique shown in FIG. 8 can then be used to trim this nearest power of two down to the actual desired size.

It is also possible to change the symbol rate and the number of carriers simultaneously. For example, if the channel could allow both a doubling of the symbol rate (due to low time delay in the multi-path echoes), and a quadrupling of the occupied bandwidth (due to an exceptionally broad channel or few other users to share with), it would make sense to simultaneously double the number of carriers and the symbol rate. These changes taken together would allow a quadrupling of the data rate in the channel.

Control of Symbol Rate and Number of Carriers

Figure 10:
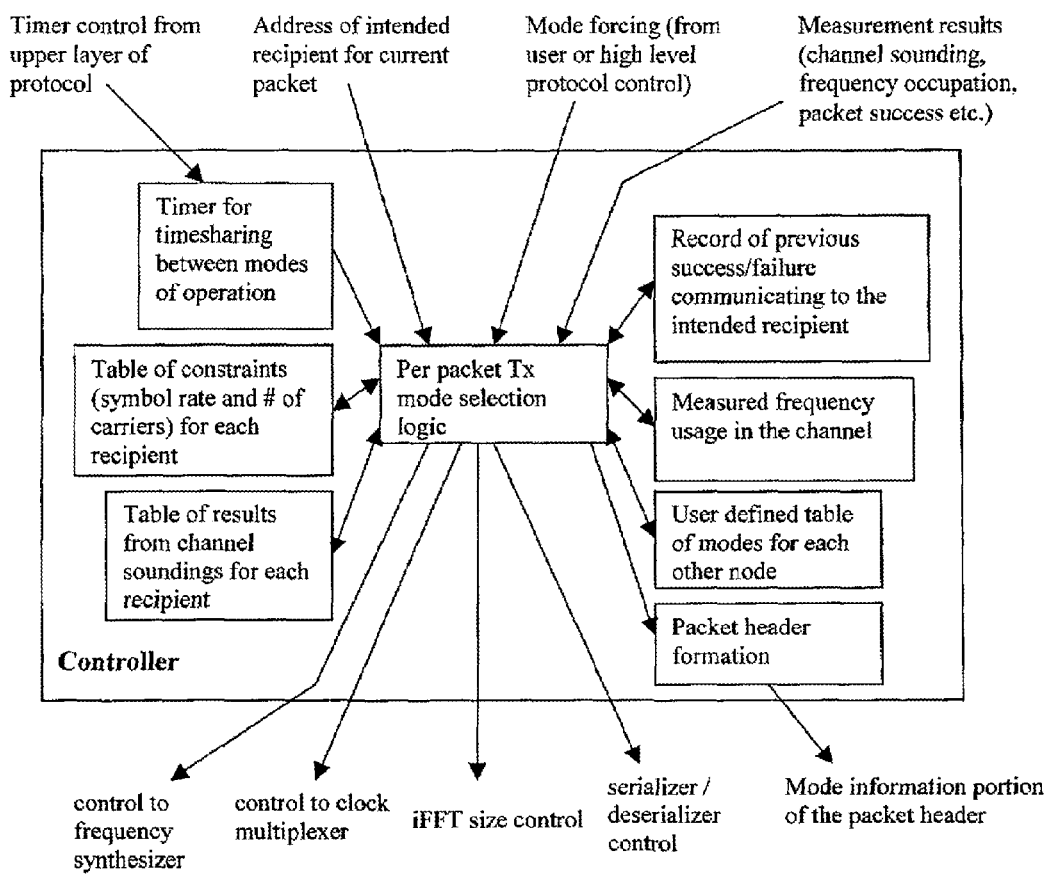
FIG. 10 shows a controller unit that has a variety of control inputs for determining the symbol rate and number of carriers that is optimal for a given situation.

FIG. 10 shows a controller unit which accepts several inputs. Based on these inputs, the controller decides the appropriate symbol rate and number of carriers according to the techniques set forth below. Each of the inputs represents a factor that is important in the decision of what symbol rate and number of carriers is appropriate to use. For example, a timer input may be used to indicate to the controller that it should operate in a predetermined mode, such as legacy mode, for a period of time, while another input allows a user or higher protocol layer to arbitrarily force the controller to operate in a particular mode. Any number of inputs could be used, but the shown preferred approach combines the factors listed below. For convenience, in the following section the combination of symbol rate and number of carriers will be called the operating "mode."

Setting the Operating Mode Based on Prior Knowledge

The desired operating mode may be based upon prior knowledge of the quality of the channel a node will encounter. For example, if a controller knows it has a very short (in terms of distance) communication channel with weak and short multi-path echoes, it can force the nodes on the network to operate with a high symbol rate. Similarly, if it knows there is a lot of spectrum available because the channel is wide and the channel bandwidth does not need to be shared with other systems, it can force the nodes in the network to operate with a high symbol rate (if there is little multi-path echo) or with many carriers (if there is significant multi-path echo).

It may be advantageous to set all nodes communicating in a given network to the same operating mode. This enables all nodes to understand all messages, and prevents them from having to quickly change from one operating mode to another. On the other hand, the channel between a given pair of nodes may be different than the channel between other pairs in the network. If this is known, and maximum efficiency is desired, it may be best to assign the operating mode on a pair-by-pair basis. Therefore, a given node may transmit in a different mode depending on which node it is transmitting to. This will require nodes to change modes, potentially on a packet-by-packet basis, depending on who is sending or receiving the current packet.

Setting the Operating Mode Based on Measurement

The best operating mode could be based on a trial "sounding" of the communications channel. The transmitter would send out a special signal (e.g., a reference signal having constant and known phase/magnitude characteristics that can be easily observed) or packet of information. The receiver would analyze this signal to determine the quality of the channel. Factors would include the multi-path delay as well as the total available bandwidth. These observations would be sent back to the original transmitter, presumably using a very robust mode of transmission, or at least a mode of transmission that is receivable for the channel in question. At this point, both nodes will be aware of the channel conditions. The channel sounding signal ideally would span the maximum bandwidth that the nodes would consider using. However, it may be possible to infer many things about the channel (such as multi-path echoes) using a narrower bandwidth signal. In addition, it may be possible to determine some channel degradations, such as if another node is using a portion of the channel, simply by listening to the channel.

It may be preferred not to send a unique channel sounding message for efficiency reasons. Instead, the nodes could transmit at a base mode, i.e., a mode which all nodes can understand, even in a worst-case scenario. Assuming that is successful, the nodes could move to more and more complex, and higher data rate, modes. Eventually when communication fails, they would have learned the highest rate at which communication can be achieved. The same process could be followed in reverse, starting from the highest mode and backing down to the lowest mode until transmission is successful.

Once the best mode for communication has been established between a particular pair of devices, this mode can be stored and used in the future without repeating the initial learning process. However, the channel may change over time, particularly if it is a radio channel. In that case, periodic relearning, or period experimenting to see which modes work or do not work, might be required.

Changing the Operating Mode on a Packet-by-Packet Basis

There are several reasons to change the mode of communication on a packet-by-packet basis. At the receiver, a packet from one transmitting node may be followed by a packet from a different transmitting node. The channel may be different for the two transmitting nodes, and therefore they may have decided to use different modes for their transmission. In addition, the different transmitting nodes may have different capabilities, forcing them to employ different modes of transmission. In either case, the receiving node needs to quickly change its mode based on the arriving packet.

A preferred approach might be to have a short header on the packet that would be in a base mode that all nodes could receive and would always expect at the beginning of the packet. Within that header would be an indication of which mode the remainder of the packet will be in. The receiver would then quickly switch modes to receive the remainder of the packet.

Similarly, when transmitting, the mode may need to be adjusted on a packet-by-packet basis to accommodate different destinations. Different destinations may be through different channels with different bandwidths, multi-path echo, or interference from other users. In addition, a given destination might support only a subset of the available modes of the transmitter. In particular, previous generation devices may not support as many different modes as newer devices. In all cases, the transmitting node will need to be able to change modes for each packet destination. Preferably, it should signal the mode a particular packet is going to use in the header of the packet as described above.

Another way to support "legacy" nodes that do not operate in the newer modes is to have a period of time during which all nodes act in a legacy mode. This period of time can be fixed, or it can be determined by listening for legacy nodes to request service. For example, in a radio network, an access point or a base station could periodically send a message in a legacy mode asking if any nodes that can only operate in that mode require service. If it gets a response, the base station could then schedule a period of time of operation in the legacy mode so those nodes could accomplish their tasks.

Respecting Constraints

While a node has a tremendous number of possible modes to choose from, the controller unit should be sure to stay within certain constraints. One constraint would be the total consumed bandwidth. In radio systems, the FCC regulates the usage of the spectrum. The controlling circuit must insure that whatever mode is chosen will not violate FCC rules. Similarly, the FCC limits the spurious emissions that may emanate from wired communication systems. These limitations are dependent in part on the frequency of the spurious emissions. Once again it is important to limit the total bandwidth of the transmitted signal.

Another constraint described above is that all nodes may not support all modes. Broadcast messages, or any other messages that need to be received by multiple nodes, must be transmitted in a mode that all nodes to which they are directed are able to receive.

Communicating the Mode of Operation

One method for communicating the mode of operation, as disclosed above, is to signal it in the header of the packet. If nodes are not able to change modes very quickly (within the middle of a packet) it might be preferred to send a first short exchange establishing the mode at which the data communication will take place. This first short exchange would be done with a base mode of operation that all nodes support.

If the mode of operation will not be changed on a packet-by-packet basis, a user might manually configure all nodes in a network with a single operating mode, or with a table that describes the operating mode for each possible connection. On the other hand, the user might program only one node in such a manner and have other nodes learn of the desired node setting through communication with other nodes. For example, when a new node enters a network, it could learn of the operating mode by listening to the other nodes in the network, either seeing which operating mode they are in, or receiving a packet header or special packet. The special packet might indicate what mode they are in or might contain the complete table of which nodes employ which modes of operation. The packet header or special packet could be transmitted in some base mode that all nodes are guaranteed to support.

The present invention has been described above in connection with preferred embodiments thereof however, this has been done for purposes of illustration only, and the invention is not so limited. Indeed, variations of the invention will be readily apparent to those skilled in the art and also fall within the scope of the invention. For example, although preferred embodiments of the present invention are implemented using a wireless communication medium, it will be readily apparent to those skilled in the art that it may be applied to a number of other communication media with similar benefits. Such variations also fall within the scope of the claims appended hereto.

What is claimed is:

1. An apparatus for communicating in a wireless multi-carrier system comprising:
   a transmitter; and
   a controller unit coupled to the transmitter, wherein:
   the controller unit is configured for setting in the transmitter an initial number of carriers and an initial symbol rate at which symbols are transmitted from the transmitter to a receiver;
   the transmitter is configured for transmitting a first group of symbols using the initial number of carriers and the initial symbol rate;
   the controller unit is further configured for changing in the transmitter the rate at which symbols are transmitted from the transmitter to the receiver from the initial symbol rate to a subsequent symbol rate that is different than the initial symbol rate by changing a frequency that is used to clock a serial to parallel converter, a divide by N counter coupled to an iFFT, and a parallel to serial converter by changing a multiplexer output, thereby selecting a different circuit capable of generating the subsequent symbol rate rather than a previous circuit capable of generating the initial symbol rate; and
   the transmitter is further configured for transmitting a second group of symbols using the initial number of carriers and the subsequent symbol rate.

2. The apparatus according to claim 1 wherein the controller unit is further configured for selecting between the different circuit and the previous circuit such that the different circuit and the previous circuit respectively provide a subsequent symbol clock rate and an initial symbol clock rate using at least one of a multiplier and divider.

3. An apparatus for communicating in a wireless multi-carrier system comprising:
   a transmitter; and
   a controller unit coupled to the transmitter, wherein:
   the controller unit is configured for setting in the transmitter an initial number of carriers and an initial symbol rate at which symbols are transmitted from the transmitter to a receiver;
   the transmitter is configured for transmitting a first group of symbols using the initial number of carriers and the initial symbol rate;
   the controller unit is further configured for changing in the transmitter the number of carriers in active use from the initial number of carriers to a subsequent number of carriers that is different than the initial number of carriers by dynamically informing the transmitter of those carriers that were used in the initial number of carriers and will not be used in the subsequent number of carriers by placing zero magnitude signals on those carriers within the transmitter, wherein each carrier is individually selected to be used/not used; and the transmitter is further configured for transmitting a second group of symbols using the subsequent number of carriers.

4. An apparatus for communicating in a wireless multicarrier system comprising:

a transmitter; and a controller unit coupled to the transmitter, wherein:

the controller unit is configured for setting in the transmitter an initial number of carriers and an initial symbol rate at which symbols are transmitted from the transmitter to a receiver;

the transmitter is configured for transmitting a first group of symbols using the initial number of carriers and the initial symbol rate;

the controller unit is further configured for changing in the transmitter the number of carriers in active use from the initial number of carriers to a subsequent number of carriers that is different than the initial number of carriers by dynamically informing the transmitter of those carriers that were not used in the initial number of carriers and will be used in the subsequent number of carriers by placing data conveying signals into those carriers that previously had zero magnitude signals within the transmitter, wherein each carrier is individually selected to be used/not used; and the transmitter is further configured for transmitting a second group of symbols using the subsequent number of carriers.

5. An apparatus for communicating in a wireless multicarrier system comprising:

a transmitter; and a controller unit coupled to the transmitter, wherein:

the controller unit is configured for setting in the transmitter an initial number of carriers and an initial symbol rate at which symbols are transmitted from the transmitter to a receiver;

the transmitter is configured for transmitting a first group of symbols using the initial number of carriers and the initial symbol rate;

the controller unit is further configured for changing in the transmitter the number of carriers in active use from the initial number of carriers to a subsequent number of carriers that is different than the initial number of carriers by changing an iFFT size of an iFFT in the transmitter by a factor that is a power of two, and wherein the step of changing in the transmitter the number of carriers in active use further includes the step of dynamically informing the transmitter of those carriers that were used in the initial number of carriers and will not be used in the subsequent number of carriers by placing zero magnitude signals on those carriers within the transmitter, wherein each carrier is individually selected to be used/not used; and the transmitter is further configured for transmitting a second group of symbols using the subsequent number of carriers.

6. An apparatus for communicating in a wireless multicarrier system comprising:

a transmitter; and a controller unit coupled to the transmitter, wherein:

the controller unit is configured for setting in the transmitter an initial number of carriers and an initial symbol rate at which symbols are transmitted from the transmitter to a receiver;

the transmitter is configured for transmitting a first group of symbols using the initial number of carriers and the initial symbol rate;

the controller unit is further configured for changing in the transmitter the number of carriers in active use from the initial number of carriers to a subsequent number of carriers that is different than the initial number of carriers by changing an iFFT size of an iFFT in the transmitter by a factor that is a power of two, and wherein the step of changing in the transmitter the number of carriers in active use further includes the step of dynamically informing the transmitter of those carriers that were not used in the initial number of carriers and will be used in the subsequent number of carriers by placing data conveying signals into those carriers that previously had zero magnitude signals within the transmitter, wherein each carrier is individually selected to be used/not used; and the transmitter is further configured for transmitting a second group of symbols using the subsequent number of carriers.

7. An apparatus for communicating in a wireless multicarrier system comprising:

a transmitter; and a controller unit coupled to the transmitter, wherein:

the controller unit is configured for setting in the transmitter an initial number of carriers and an initial symbol rate at which symbols are transmitted from the transmitter to a receiver;

the transmitter is configured for transmitting a first group of symbols using the initial number of carriers and the initial symbol rate;

the controller unit is further configured for changing in the transmitter:

the rate at which symbols are transmitted from the transmitter to the receiver from the initial symbol rate to a subsequent symbol rate that is different than the initial symbol rate by changing a frequency that is used to clock a serial to parallel converter, a divide by N counter coupled to an iFFT, and a parallel to serial converter by changing a multiplexer output, thereby selecting a different circuit capable of generating the subsequent symbol rate rather than a previous circuit capable of generating the initial symbol rate; and the number of carriers in active use from the initial number of carriers to a subsequent number of carriers that is different than the initial number of carriers; and the transmitter is further configured for transmitting a second group of symbols using the subsequent number of carriers and the subsequent symbol rate.

8. The apparatus according to claim 7 wherein the controller unit is further configured for selecting between the different circuit and the previous circuit such that the different circuit and the previous circuit respectively provide a subsequent symbol clock rate and an initial symbol clock rate using at least one of a multiplier and divider.

9. An apparatus for communicating in a wireless multicarrier system comprising:

a transmitter; and a controller unit coupled to the transmitter, wherein:

the controller unit is configured for setting in the transmitter an initial number of carriers and an initial symbol rate at which symbols are transmitted from the transmitter to a receiver;

the transmitter is configured for transmitting a first group of symbols using the initial number of carriers and the initial symbol rate;

the controller unit is further configured for changing in the transmitter:

the rate at which symbols are transmitted from the transmitter to the receiver from the initial symbol rate to a subsequent symbol rate that is different than the initial symbol rate; and the number of carriers in active use from the initial number of carriers to a subsequent number of carriers that is different than the initial number of carriers by dynamically informing the transmitter of those carriers that were used in the initial number of carriers and will not be used in the subsequent number of carriers by placing zero magnitude signals on those carriers within the transmitter, wherein each carrier is individually selected to be used/not used; and the transmitter is further configured for transmitting a second group of symbols using the subsequent number of carriers and the subsequent symbol rate.

10. An apparatus for communicating in a wireless multicarrier system comprising:

a transmitter; and a controller unit coupled to the transmitter, wherein:

the controller unit is configured for setting in the transmitter an initial number of carriers and an initial symbol rate at which symbols are transmitted from the transmitter to a receiver;

the transmitter is configured for transmitting a first group of symbols using the initial number of carriers and the initial symbol rate;

the controller unit is further configured for changing in the transmitter:

the rate at which symbols are transmitted from the transmitter to the receiver from the initial symbol rate to a subsequent symbol rate that is different than the initial symbol rate; and the number of carriers in active use from the initial number of carriers to a subsequent number of carriers that is different than the initial number of carriers by dynamically informing the transmitter of those carriers that were not used in the initial number of carriers and will be used in the subsequent number of carriers by placing data conveying signals into those carriers that previously had zero magnitude signals within the transmitter, wherein each carrier is individually selected to be used/not used; and the transmitter is further configured for transmitting a second group of symbols using the subsequent number of carriers and the subsequent symbol rate.

11. An apparatus for communicating in a wireless multicarrier system comprising:

a transmitter; and a controller unit coupled to the transmitter, wherein:

the controller unit is configured for setting in the transmitter an initial number of carriers and an initial symbol rate at which symbols are transmitted from the transmitter to a receiver;

the transmitter is configured for transmitting a first group of symbols using the initial number of carriers and the initial symbol rate;

the controller unit is further configured for changing in the transmitter:

the rate at which symbols are transmitted from the transmitter to the receiver from the initial symbol rate to a subsequent symbol rate that is different than the initial symbol rate; and the number of carriers in active use from the initial number of carriers to a subsequent number of carriers that is different than the initial number of carriers by changing an iFFT size of an iFFT in the transmitter by a factor that is a power of two and by dynamically informing the transmitter of those carriers that were used in the initial number of carriers and will not be used in the subsequent number of carriers by placing zero magnitude signals on those carriers within the transmitter, wherein each carrier is individually selected to be used/not used; and the transmitter is further configured for transmitting a second group of symbols using the subsequent number of carriers and the subsequent symbol rate.

12. An apparatus for communicating in a wireless multicarrier system comprising:

a transmitter; and a controller unit coupled to the transmitter, wherein:

the controller unit is configured for setting in the transmitter an initial number of carriers and an initial symbol rate at which symbols are transmitted from the transmitter to a receiver;

the transmitter is configured for transmitting a first group of symbols using the initial number of carriers and the initial symbol rate;

the controller unit is further configured for changing in the transmitter:

the rate at which symbols are transmitted from the transmitter to the receiver from the initial symbol rate to a subsequent symbol rate that is different than the initial symbol rate; and the number of carriers in active use from the initial number of carriers to a subsequent number of carriers that is different than the initial number of carriers by changing an iFFT size of an iFFT in the transmitter by a factor that is a power of two and by dynamically informing the transmitter of those carriers that were not used in the initial number of carriers and will be used in the subsequent number of carriers by placing data conveying signals into those carriers that previously had zero magnitude signals within the transmitter, wherein each carrier is individually selected to be used/not used; and the transmitter is further configured for transmitting a second group of symbols using the subsequent number of carriers and the subsequent symbol rate.

\* \* \* \* \*